Figure 1:
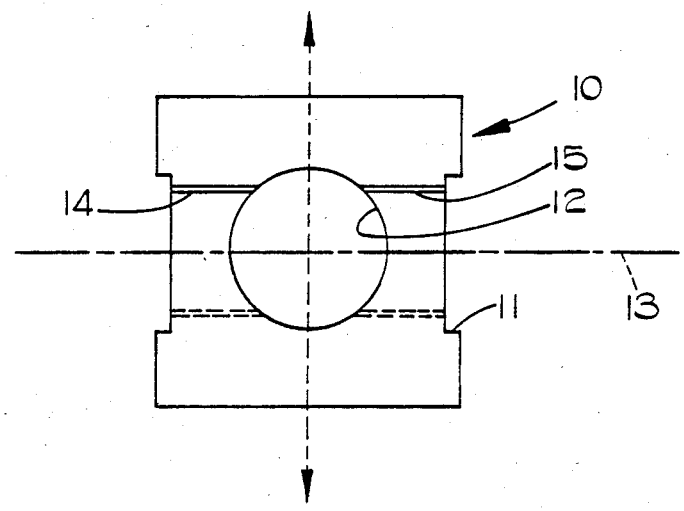

United States Patent [19]

Downs

[11] Patent Number: 4,604,784
[45] Date of Patent: Aug. 12, 1986

[54] CAM FOLLOWER SHOE

[75] Inventor: John Downs, Bradford-on-Avon, England

[73] Assignee: Lucas Industries public limited company, Birmingham, England

[21] Appl. No.: 725,232

[22] Filed: Apr. 19, 1985

[30] Foreign Application Priority Data

Apr. 26, 1984 [GB] United Kingdom ............. 8410700

[51] Int. Cl.$^4$ .......................................... B23P 17/00
[52] U.S. Cl. ................................. 29/415; 29/413; 29/416
[58] Field of Search .................... 29/415, 413, 416

[56] References Cited

U.S. PATENT DOCUMENTS 371,312  10/1887  Gracey ............................. 29/415
4,109,361  8/1978  Hagen et al. ..................... 29/415

Primary Examiner—Howard N. Goldberg
Assistant Examiner—Steven Nichols

[57] ABSTRACT

A cam follower shoe for a fuel injection pump is constructed to hold captive the roller of the cam follower. Two shoes are constructed at the same time from a single block of material which is bored to produce a bore and is then divided into two parts by a pair of cuts which extend axially crossing from one side of a diametral plane to the other, the plane being normal to the direction of movement of the shoe in use. At one end of each shoe the surface subtends an angle of less than 180° but at the other end of the shoe when the cuts are straight, the surface subtends an angle of greater than 180°.

8 Claims, 6 Drawing Figures

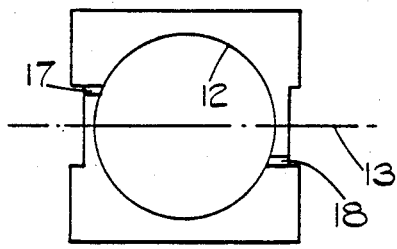
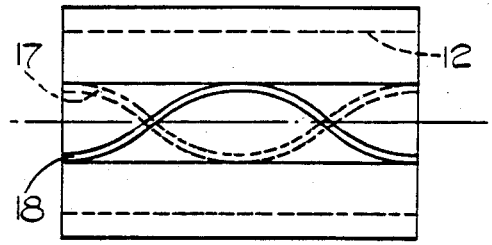
FIG.3.  FIG.4.
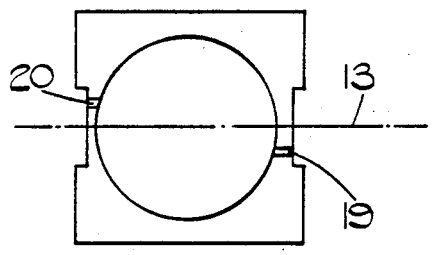
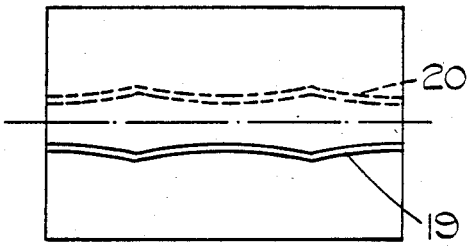
FIG.5.  FIG.6.

CAM FOLLOWER SHOE

This invention relates to a method of making a cam follower shoe for use in a fuel injection pump of the kind comprising a plunger reciprocable within a bore, a cam ring having cam lobes formed thereon and a cam follower disposed between the cam ring and the plunger, the cam follower shoe engaging the plunger and defining a recess having a part cylindrical surface which locates a roller, said roller also being engageable with said cam ring.

In the specification of British Published Application No. 2090342A there is described a method of making cam follower shoes, the method essentially comprising placing two pieces of suitably shaped metal in face to face relationship and then forming a bore in the assembled pieces, the axis of the bore being coincident with the contacting faces of the two pieces of metal. The two pieces of metal are separated to form the shoes and each shoe has a recess formed in it having a cylindrical surface which extends in total through no more than 180°. This method of manufacture facilitates the production of the shoes but since the aforesaid surfaces of the recesses do not extend through more than 180°, the rollers are not captive with the shoes. The aforesaid specification describes how the rollers can be retained relative to the shoes so that they cannot become completely separated during assembly of the pump. This requires the provision of side plates which are mounted on a distributor member forming part of the pump and in which the bore accommodating the plunger is formed. In addition, the rollers are provided with reduced end portions which locate in slots formed in the aforesaid plates. The provision of the side plates and the specially constructed rollers adds to the cost of production although the formation of the recesses is greatly simplified.

Another way of producing the shoes is to form each shoe from a single block of material in which the aforesaid bore is formed. The block of material is then machined to form two separate pieces in the first of which the cylindrical surface extends through less than 180° and in the other of which the surface extends through more than 180°. The first piece is discarded and the second piece forms the shoe. In this case the roller is captive with the shoe. However, the disadvantage of this method is that a substantial amount of high grade material has to be discarded.

The object of the present invention is to provide a method of constructing the shoe of the cam follower in a simple and convenient form.

According to the invention a method of making a shoe for use in a pump of the kind specified comprises forming and finishing a bore in a block of material, and dividing the block into two pieces by means of two axially extending cuts extending outwardly from the bore, the cuts during their formation crossing at least once from one side to the other of a diametral plane of the bore, said plane being disposed at right angles to the plane of movement of the shoes in use, the two pieces forming shoes respectively, each recess in each shoe subtending a total angle of more than 180° whereby rollers located in the recesses will be held captive therein.

According to another aspect of the invention the bored block is divided into two pieces by means of two cuts extending outwardly from the bore, the cuts being disposed on opposite sides of a diametral plane of the bore, said plane being disposed at right angles to the plane of movement of the shoes in use, said cuts being of a scalloped nature and moving towards and away from the diametral plane in synchronism whereby the angle subtended by the arcuate surfaces of the recesses in the pieces at any section along their lengths will be less than 180° but the centres of the arcuate lengths of the recesses move angularly about the centres of curvature of the recesses so that each recess subtends a total angle of more than 180°.

Figure 2:
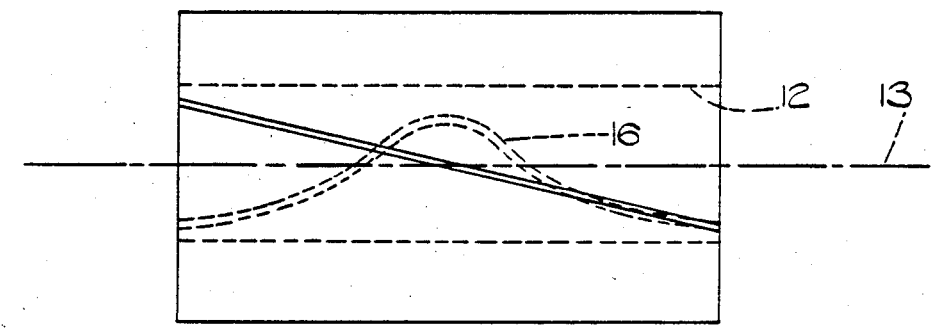

Examples of methods of making the shoes of the cam followers will now be described with reference to the accompanying drawings in which:

FIG. 1 is an end elevation of a block of material from which a pair of shoes are formed, FIG. 2 is a side elevation of the block of material shown in FIG. 1, and FIGS. 3 and 5 are views similar to FIG. 1 showing alternative ways of constructing the shoes, FIGS. 4 and 6 being views similar to FIG. 2 but being related to FIGS. 3 and 5 respectively.

The cam followers of which the shoes form part are for use in a fuel injection pump of the kind in which a rotary distributor member is mounted in a surrounding body and is driven in synchronism with an associated engine. The distributor member is provided with a transversely extending bore in which is mounted a pair of pumping plungers which are moved inwardly by the action of cam lobes formed on the internal peripheral surface of an annular cam ring. The plungers during their inward movement displace fuel from the bore to an outlet and when the plungers are allowed to move outwardly by the cam lobes, fuel is supplied to the bore.

Cam followers are positioned between the outer ends of the plungers and the internal peripheral surface of the cam ring. Each cam follower comprises a shoe which engages the plunger, the shoe having a recess in which is mounted a roller. Although the shoes may be slidably mounted within slots formed in the distributor member at the outer ends of the bore respectively, it is more usual to mount them in slots formed in an annular member connected to a drive shaft, the annular member surrounding the distributor member. In this manner the torque required to drive the cam followers in the circumferential direction derives directly from the drive shaft of the pump rather than the distributor member. During assembly of the pump it is convenient to have the rollers captive with the shoes since this facilitates assembly.

Turning now to FIGS. 1 and 2 of the drawings the individual shoes are constructed from a single block of material indicated at 10. The surfaces of the block can be machined to size and as seen in FIG. 1 the sides define ledges 11. The block 10 is initially bored along its length and then ground to form a bore 12 having a diameter equal to that of the aforesaid rollers. The block 10 is then divided into two pieces which form the shoes. The direction of movement of the shoes in use is shown by the arrows and at right angles to the direction of movement there is shown a diametral plane 13 which is of course coincident with the axis of the bore 12.

The block 10 is divided into two parts by means of a pair of cuts 14, 15 which extend axially along the block and which also extend outwardly from the bore. The cuts in the example of FIG. 1 are aligned and as will be seen from FIG. 2 cross the aforesaid plane 13. The two shoes thus formed each have a recess the surface of which at one end of the shoe subtends an angle of substantially less than 180° but at the other end subtends an angle of substantially more than 180°. Rollers inserted in the recesses will therefore be prevented from moving out of the recesses in the direction of movement of the shoes in use. The inclination and the initial positioning of the cuts has to be carefully chosen so that sufficient bearing surface exists for the rollers and also the rollers project beyond the shoes by a sufficient amount to ensure that there is no interference with the cam lobes. The cuts at any section taken at right angles to their lengths, extend outwardly from the bore parallel to the aforesaid diametral plane. They can however be inclined to the plane and that will produce a handed pair of shoes. Providing the shoes are assembled correctly in the pump improved hydrodynamic support is afforded to the roller.

With the above arrangement the rollers are retained against movement in the direction of the arrows towards one end only and it is therefore possible for the rollers to tip. In order to avoid this the cuts instead of being straight may follow a sinuous path as indicated in dotted outline at 16, in FIG. 2. Again precautions have to be taken to ensure that there is sufficient bearing area and also that the roller projects a sufficient amount. In this example the recess in one of the shoes subtends an angle of more than 180° over an intermediate portion of the recess whilst the recess in the other shoe subtends an angle of more than 180° over the end portions of the recess.

In the arrangement shown in FIGS. 3 and 4 the cuts 17 and 18 do not coincide and although they can be straight cuts it is preferred that they should be of a sinuous nature as shown in FIG. 4. It will be noted however that the cuts do cross from one side to the other of the diametral plane 13 and if this method of cutting is adopted the two shoes produced will be identical. Moreover, the total angle subtended by the surface of the recess in each shoe throughout its length, will be greater than 180° but at any section along the length of the recess the angle subtended by the surface of the recess will be less than 180°.

In the examples shown in FIGS. 5 and 6 the cuts 19, 20 do not cross the aforesaid diametral plane 13 and moreover, lie on opposite sides of the plane. The cuts as shown in FIG. 6, are of a scalloped nature with the cuts moving towards and away from the plane 13 in syncrhonism. The angles subtended by the arcuate surfaces of the recesses in the shoes at any section along the lengths of the recesses is less than 180° but the centres of the arcuate lengths of the recesses move angularly about the centres of curvature of the recesses that is to say the axis of the bore. Each recess therefore subtends a total angle of more than 180° so that rollers located in the recesses will be retained therein against movement in the direction of the aforesaid arrows.

In the manner described it is possible from a single block of material, to produce a pair of shoes which will hold captive rollers inserted axially into the recesses.

The cutting of the block of material may be achieved using any one of a number of known cutting techniques such as a fine saw, laser or chemical cutting.

I claim:

1. A method of making a shoe for use in a cam follower of a fuel injection pump comprises forming and finishing a bore in a block of material and dividing the block into two pieces by means of two axially extending cuts extending outwardly from the bore, the cuts during their formation crossing at least once from one side to the other of a diametral plane of the bore, said plane being disposed at right angles to the plane of movement of the shoes in use, the two pieces forming shoes respectively, each recess in each shoe subtending a total angle of more than 180° whereby rollers located in the recesses will be held captive therein.

2. A method according to claim 1 in which said cuts are straight and at any section taken at right angles to their length, extend outwardly from said bore parallel to said plane.

3. A method according to claim 1 in which said cuts are straight but are inclined to said plane.

4. A method according to claim 1 in which said cuts extend in a sinuous manner and cross said plane at least twice.

5. A method according to any one of claims 2, 3 or 4 in which said cuts are aligned.

6. A method according to claim 2 or claim 4 in which said cuts lie on opposite sides of said plane.

7. A method of making a shoe for use in a cam follower of a fuel injection pump comprises forming and finishing a bore in a block of material and dividing the block into two pieces by means of two cuts extending outwardly from the bore, the cuts being disposed on opposite sides of a diametral plane of the bore, said plane being disposed at right angles to the plane of movement of the shoes in use, said cuts being of a scalloped nature and moving towards and away from the diametral plane in synchronism whereby the angle subtended by the arcuate surfaces of the recesses in the pieces at any section along their lengths will be less than 180° but the centres of the arcuate lengths of the recesses move angularly about the centre of curvature of the recesses so that each recess subtends a total angle of more than 180°.

8. A shoe for use in a cam follower of a fuel injection pump when constructed in accordance with any one of the preceding claims.

* * * * *